United States Patent [19]

McKinnon et al.

[11] Patent Number: 5,448,966
[45] Date of Patent: Sep. 12, 1995

[54] AUTOMATIC ANIMAL WASHING SYSTEM

[76] Inventors: Brenda McKinnon; John McKinnon, both of R.R. 1, Box 333B, Myakka City, Fla. 34251-9602

[21] Appl. No.: 296,443

[22] Filed: Aug. 26, 1994

[51] Int. Cl.⁶ ............................................. A61D 11/00
[52] U.S. Cl. .................................................... 119/158
[58] Field of Search ............... 119/158, 159, 160, 156, 119/17, 19, 15

[56] References Cited

U.S. PATENT DOCUMENTS

| | | | |
|---|---|---|---|
| 4,020,796 | 5/1977 | Grifa | 119/158 |
| 4,056,078 | 11/1977 | Blafford | 119/158 |
| 4,057,032 | 11/1977 | Dimitriadis | 119/1 |
| 4,083,328 | 4/1978 | Baker | 119/158 |
| 4,505,229 | 3/1985 | Altissimo | 119/158 |
| 4,549,502 | 10/1985 | Namdari | 119/158 |
| 4,782,792 | 11/1988 | Anthony | 119/158 |
| 4,987,860 | 1/1991 | Davis | 119/158 |
| 5,193,487 | 3/1993 | Vogel | 119/158 |
| 5,243,931 | 9/1993 | McDonough | 119/158 |
| 5,279,257 | 1/1994 | Temby | 119/158 |

*Primary Examiner*—Todd E. Manahan
*Assistant Examiner*—Thomas Price
*Attorney, Agent, or Firm*—Franklin J. Cona

[57] ABSTRACT

A system for washing and rinsing and drying an animal automatically in an enclosed space is disclosed. The system has paired operable front doors and paired operable rear doors and paired operable roof panels in a hingeable cooperative relationship. The panels retracted to allow the animal ingress and egress prior to and after the cleaning cycle. The system has a plurality of discharge devices oriented and disposed on an interior surface of a plurality of paired opposed upstanding sidewalls in a base. A device for oscillating the plurality of discharge devices is provided to insure complete coverage of the animal's body including the underside and interior portions of the front and hind legs during the washing and rinsing and drying cycle. An aperture is oriented in a central section of one of the front door panels for allowing the animal's head to protrude from the enclosure. In this manner, there is no chance of discharge of the water outside of the enclosure. A flexible hose is provided to wash that portion of the animal's neck and head that protrudes through the aperture in the front door. A gutter is oriented forwardly of the base and being coplaner of the base to receive excess water during the washing the portion of the animal's neck and head that protrudes through the aperture. The aperture is vertically adjustable to receive the head of the animal regardless of the height of the animal. Additionally, the aperture has a variable diameter to releasably engage the neck of the animal to preclude and prevent any water from escaping through the aperture during the washing and rinsing cycle. A plurality of removable troughs is provided for the operator to selectively install the properly sized trough on the base of the system to maintain the separation of the animal's front and hind legs during the cleaning cycle. The upper surface of the trough has a non-skid material to enable the animal to remain in an upright position during the cleaning cycle. A plurality of discharge devices are disposed in an "H" bar relationship on the base of the system to supply washing water and rinsing water and drying air to the underside of the animal's body and to the interior portions of the front and hind legs.

16 Claims, 5 Drawing Sheets

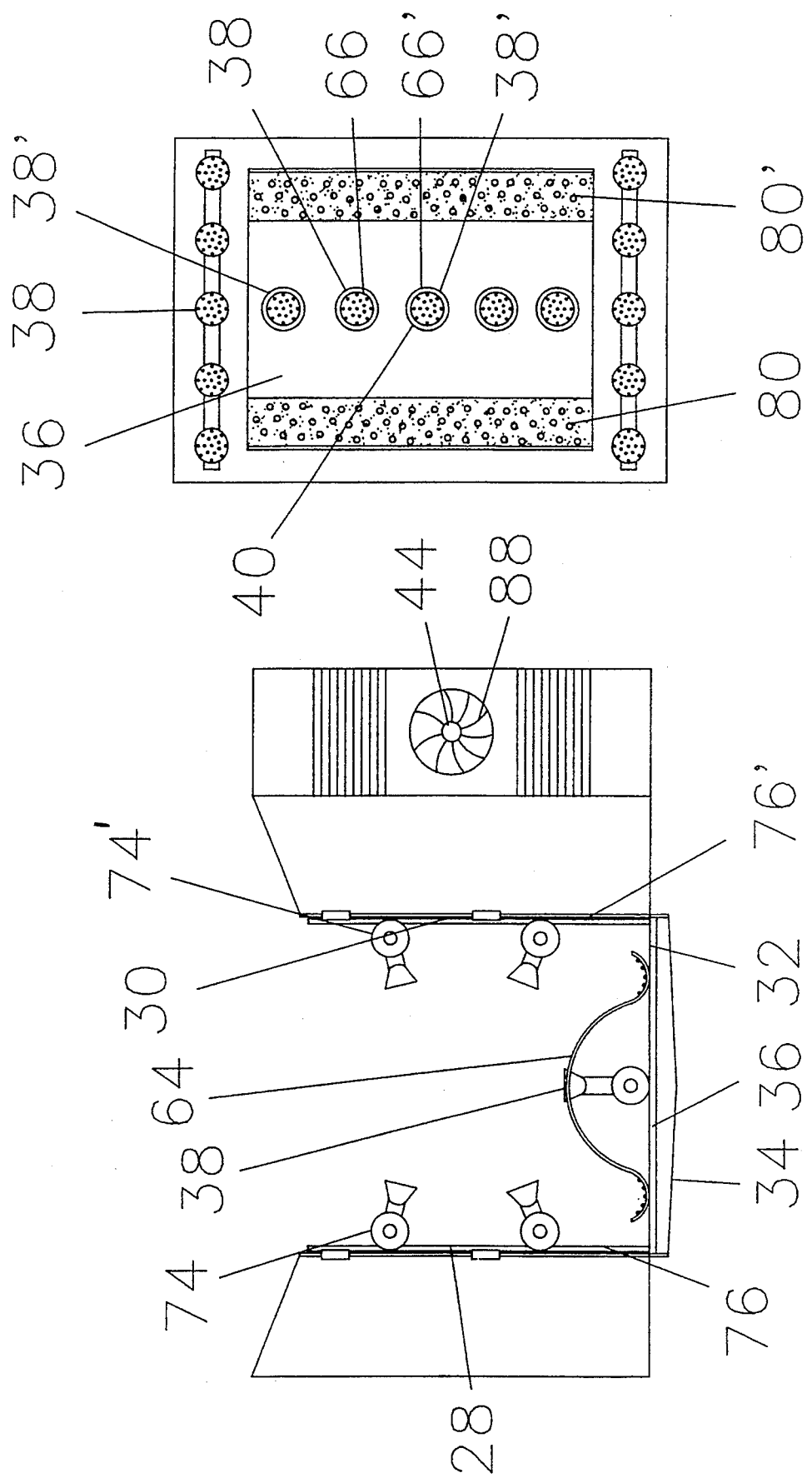

AUTOMATIC ANIMAL WASHING SYSTEM

FIELD OF THE INVENTION

The present invention relates to a system for washing and rinsing and drying an animal, and in particular an automatic system for washing and rinsing and drying an animal in an enclosure.

BACKGROUND OF THE INVENTION

Throughout the United States steps are being taken to improve the bathing of animals, and in particular to provide an automatic system to bathe animals and reduce the associated labor cost. This problem is becoming particularly acute with the inexorable rise of labor costs required in operating a kennel. The cost to bathe an animal daily must be passed on to the owners of the animals and in many cases, the owners are priced out of supplying the proper kennel facilities for their animals while they are on vacation or traveling or the like.

Additionally, many pet owners have difficulty bathing small animals such as dogs in an environment without having water sprayed all over the surrounding walls when the animal shakes itself vigorously to get rid of the water during the washing and rinsing of the animal. Pet owners know full well the mess that the dog can generate if he or she does not like to be bathed on a regular basis.

Many attempts at providing an automated system for washing and rinsing and drying an animal in an enclosed space have been made. For example, U.S. Pat. No. 4,020,796 issued to Grifa discloses a portable animal bathing apparatus having a boxlike structure in a network of perforated spray pipes interiorly disposed.

U.S. Pat. No. 4,056,078 issued to Blafford et al. discloses a dog cleaning apparatus having two enclosures and a common interior sidewall. Patent '078 discloses a water spray head in a first enclosure and a plurality of air ducts for drying the animal in the second enclosure adjacent thereto.

U.S. Pat. No. 4,057,032 issued to Dimitriadis discloses a dog bathing apparatus having an adjustable frame structure and an aperture for the head of the animal to protrude from the forward wall. Patent '032 has a plurality of water spray discharge pipes and a bottom drain pan to remove the wash water.

U.S. Pat. No. 4,505,229 issued to Altissimo discloses an automatic washing machine for dogs and other animals having a cylindrical casing and an aperture in one end for the head of an animal. The casing includes a plurality of spray nozzles within the housing to wash and dry the animal.

U.S. Pat. No. 4,987,860 issued to Davis discloses a small animal bath for domestic pets.

U.S. Pat. No. 5,193,487 issued to Vogel discloses a pet bathing apparatus having a tub, a towel and a series of accessories.

U.S. Pat. No. 5,243,931 issued to McDonough discloses an animal washing apparatus having a tub and an open roof. The animal is covered with a resilient sheeting material prior to the commencement of the washing cycle. Further, patent '931 discloses a plurality of timers and other controls and a shower head to wash the animal.

U.S. Pat. No. 5,279,257 issued to Timby discloses a portable pet washing apparatus having a transparent roof with an aperture for the dogs head and additional aperture for the person to insert their hands through and wash the animal.

U.S. Pat. No. 4,549,502 issued to Namdari discloses an apparatus having a plurality of adjustable movable brushes and a plurality of spray heads located within an enclosure. Patent '502 has a mechanism for measuring and controlling the supply of warm water to the spray heads and also has a mechanism for moving the brushes to scrub and clean the animal.

None of these previous efforts, however, provide the benefits intended with the present invention. Additionally, prior techniques do not suggest, the present inventive combination of component elements as disclosed and claimed herein. The present invention achieves its intended purposes, objectives and advantages over the prior art devices through a new, useful and unobvious combination of component elements, which is simple to use, with the utilization of a minimum number of functioning parts, at a reasonable cost to manufacture, assemble, test and by employing only readily available material.

Therefore, it is an object of the present invention to provide a system to clean an animal automatically in an enclosure including a washing and rinsing and drying cycle, all accomplished in the same enclosure. It is a further object of the invention to provide a system that is impervious to water or soap or warm air.

It is a further object of the invention to provide a system with proper controls to preclude any possibility of scalding the animal.

It is yet another object of the invention to provide a system for washing and rinsing and drying an animal that discharges washing water, rinsing water and hot air to all surfaces of the animal's body, including the interior portion of the hind and front legs and the underside of the animal's body.

It is yet another object of the invention to provide a system that is self-cleaning and requires no external purging of the piping network to maintain the system in top operating condition.

It is still another object of the invention to provide a system with a means to allow the animal's head and neck to protrude from the enclosure to avoid terrorizing the animal during the cleaning cycle.

It is another object of the invention to provide a system that will trap and direct all of the water used during the cycle including that water used to wash the protruding neck and head portion of the animal into a common drain.

It is yet another object of the invention to provide a system that allows the animal to maintain a comfortable stance with the legs being properly separated during the entire cleaning cycle.

It is still another object of the invention to provide a system that will accommodate a neck and head portion of the animal, regardless of the size of the animal and have means to releasably engage and secure the neck to eliminate any water being sprayed accidently through the aperture.

A final object of this invention to be specifically enumerated herein is to provide an automatic animal washing system in accordance with the preceding objects and which will conform to conventional forms of manufacture, be of simple construction and easy to use so as to provide a device that would be economically feasible, long lasting and relatively trouble free in operation.

Although there have been many inventions related to automatic animal washing systems, none of the inventions have become sufficiently compact, low cost and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The invention can be summarized as a system for washing and rinsing and drying an animal automatically in an enclosed space. The invention comprises paired operable front doors and rear doors and roof panels in a hingeable cooperative relationship. The panels are movable to allow the animal to be inserted into the enclosure and then hingeably close on the animal to provide a watertight enclosure for allowing the cleaning cycle to commence. A gutter is oriented forwardly of a base of the enclosure and is adapted to receive any excess water from the head and neck portion of the animal that protrudes through an aperture in one of the front doors. The aperture is vertically adjustable to receive the head of an animal regardless of the height of the animal. Further, the aperture has a variable size to releasably engage the neck of the animal to preclude any water from escaping through the aperture during the washing and rinsing and drying cycle.

A plurality of removable troughs is provided for the operator to selectively install the properly sized trough on the base of the system to maintain the separation of the animal's front and hind legs during the cleaning cycle. The upper surface of the trough has a non-skid material to enable the animal to remain in an upright position during the cleaning cycle. A plurality of discharge devices are disposed in an "H" bar relationship on the base of the system to supply washing water and rinsing water and drying air to the underside of the animal's body and to the interior portions of the front and hind legs.

BRIEF DESCRIPTION OF THE DRAWINGS

For a fuller understanding of the nature and objects of the invention, reference should be had to the following detailed description taken in connection with the accompanying drawings in which:

FIG. 3 is a front elevation view of the invention as shown in FIG. 2 further illustrating the separators for maintaining the animal's front and rear legs in a stationary position and the dual walled floor for urging drainage therethrough;

FIG. 4 is a top plan view of the floor of the invention as shown in FIG. 1 further disclosing the "H" bar patterning of the oscillating shower head washing means and the non-skid surface area of the flexible spacers disposed on the upper level of the dual level base;

Similar reference characters refer to similar parts throughout the several views of the drawings.

DETAILED DESCRIPTION OF THE PREFERRED EMBODIMENT

Figure 1:
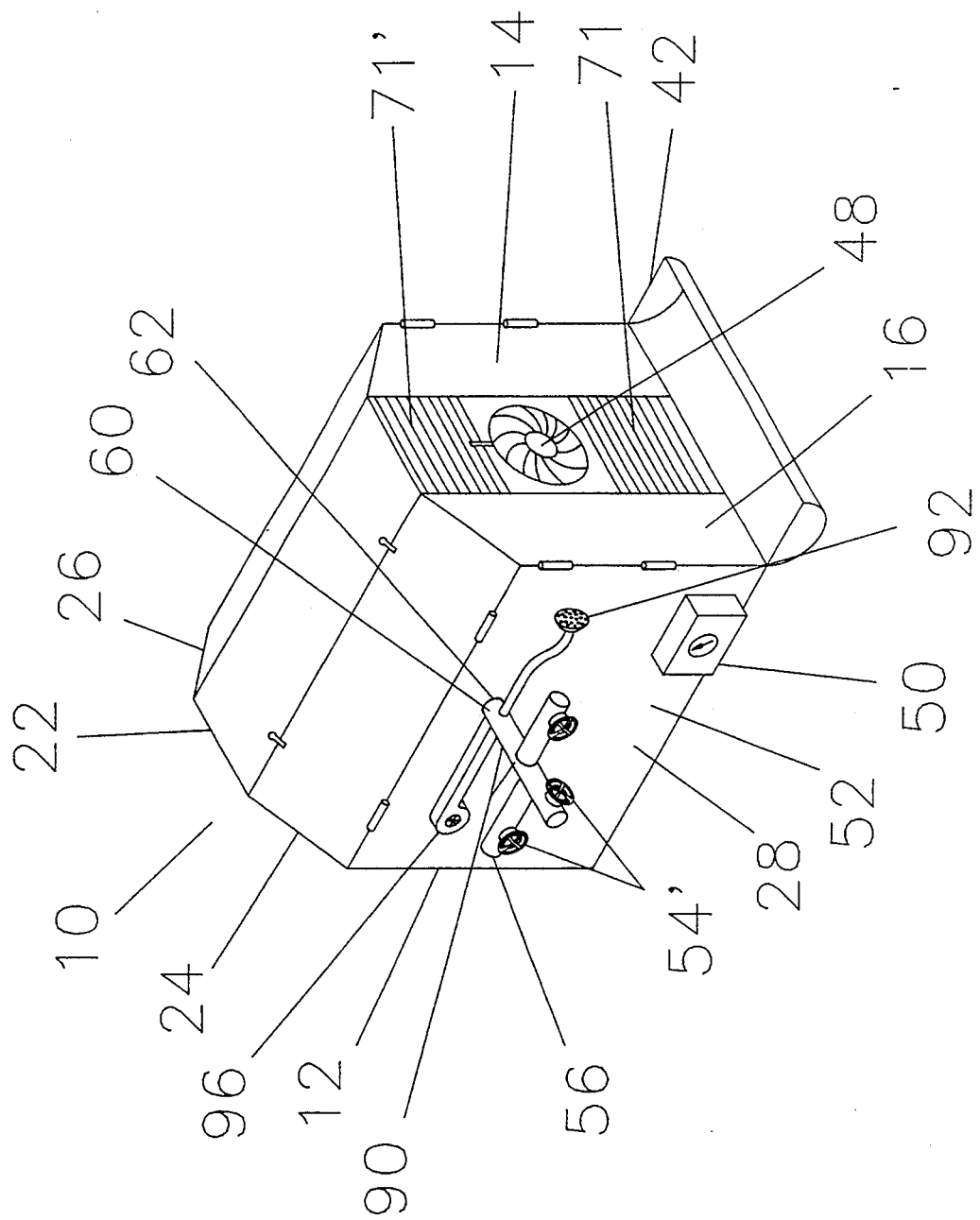
FIG. 1 is a perspective view of the invention with the control systems mounted on an upstanding sidewall and the invention being in a totally enclosed status.

Referring now to FIG. 1, the invention 10 comprises an enclosure 12 made completely of water resistant material, preferably fiberglass. The enclosure 12 has a pair of front doors 14, 16 and a pair of rear doors 18, 20 that are operable. Also, the enclosure 12 has a roof 22 having paired operable roof panels 24, 26 that are retractable to allow easy insertion and removal of the animal prior to and after the washing cycle. A pair of fixed upstanding sidewalls 28, 30 are in hingeable communication with the front doors 14, 16 and rear doors 18, 20 and roof panels 24, 26.

A base 32 having a double floor 34, 36 arrangement is horizontally disposed and oriented between the paired fixed upstanding sidewalls 28, 30. The lower floor 34 of the base 32 is attached to a conventional plumbing outlet for draining the washing and rinsing water during the automatic cleaning cycle of the animal. The upper floor 36 is adapted to receive a plurality of discharge devices 38, 38' in an "H" bar manifold arrangement 40. The discharge devices 38, 38' are disposed in a manner to insure that all interior surfaces of the animal's legs as well as the underside of the animal's body receives an adequate supply of wash water and rinse water and drying air. A gutter 42 is oriented forward of the base 32 and is in a coplaner orientation with the base 32 for receiving water that drips from the head of the washed animal during the cleaning cycle.

The paired operable front doors 14, 16 include a first operable front door 14 that has a section 44 that is vertically adjustable in an accordion cleated relationship. The vertically adjustable section 44 has a center portion 46 with an aperture 48 adapted to releasably engage the head of the animal during the washing and rinsing and drying cycle.

The entire cleaning cycle of washing and rinsing and drying of the animal is controlled automatically by a conventional timer 50 that is disposed on an outside surface 52 of the fixed upstanding wall 28. The timer 50 controls the flow of water and soap and heated air during the cleaning cycle. The water and soap and heated air traverse the inside of a plurality of valves 54, 54' and fittings 56, that are also located on the outside surface 52 of the upstanding sidewall 28. A conventional temperature control sensor 60 is located in a downstream portion 62 of the fitting 56, and transmits a temperature sensing signal back to the automatic timer 50 to eliminate any potential for scalding the animal with excessively hot water.

A plurality of nested troughs 64, 64' are provided to maintain separation of the legs during the washing and rinsing cycle. In use and operation, the operator selects the appropriately sized trough 64 to accommodate the proper size animal and installs the selected trough 64 on the upper floor 36 of the base 32. The trough 64 has a plurality of apertures 66, 66' that are adapted to receive the plurality of discharge devices 38, 38' for maintaining the proper distribution of the wash water and rinse water and drying air during the cleaning cycle. Each trough 64, 64' is sized to accommodate an animal of different height and girth.

The paired operable front doors 14, 16 have unequal widths. The paired operable roof panels 24, 26 have a width that is consistent with the respective door 14, 16 that is in releasable engagement. The rear doors 18, 20 also have unequal widths.

The gutter 42 is oriented below the aperture 48 in the adjustable section 44 and captures the wash water and rinse water from the portion of the animal's body that protrudes from the aperture. The aperture 48 is vertically adjustable and further includes a pair of takeup containers 68, 68' that are oriented above and below the vertically adjustable section 44 on an inner side 70 of the operable front doors 14. The vertically adjustable section 44 is made up of serrated compound transverse members 71, 71' that are adapted to roll up on a conventional reel (non-illustrated) that is located in the upper and lower takeup container 68, 68'. In this manner, the vertically adjustable section 44 is moved in a direction and positioned to accept the head and a portion of the neck of the animal, regardless of the height or size of the animal.

A second plurality of discharge devices 74, 74' are disposed on an inside surface 76, 76' of the upstanding sidewalls 28, 30 and an inside surface 78, 78' of the operable movable roof panels 24, 26. Further, a means to oscillate the discharge devices is provided to insure that all portions of the animal's body receive the proper amount of wash water and rinse water and drying air. Likewise, the first plurality of discharge devices 38, 38' oriented on the top floor 36 of the base 32 and in an "H" bar arrangement also are adapted to have oscillating means to insure that the underside of the animal's body receives the proper amount of wash water and rinse water and drying air.

Each trough 64, 64' is coated with a plurality of protuberances 80, 80' to provide a non-skid surface 82 for engaging the paws of the animal and restricting slippage during the washing, rinsing, and drying cycle. The troughs 64, 64' are made of a water resistant material preferably fiberglass, and the protuberances 80, 80' are preferably sand with appropriate painting material to adhere the sand to the surface 82 of the trough 64, 64'. The oscillating means to direct the flow of wash water, rinse water, and drying air is preferably a conventional cam mechanism actuated by a conventional electric motor which is in rotational communication with a cam and a shaft therebetween.

The plurality of valves 54, 54' and pipes 56, are connected to the plurality of discharge devices 38, 38' and the second plurality of discharge devices 74, 74' with conventional plastic flexible tubing 84. The operable roof panels 24, 26 are connected to the plurality of valves 54, 54' and pipes 56, with an additional length of flexible plastic tubing 86 to accommodate the movement of the plurality of discharge devices 74, 74' when the roof panels 24, 26 are retracted.

The aperture 48 in the vertically adjustable section 44 of the operable front door 14 has a means 88 or a plurality of integrated flaps to vary the size of the aperture 48 to obtain a snug releasable engagement with the neck portion of the animal and to preclude the water from spraying through the aperture 48 if the fit were not correct.

The invention 10 is self-cleaning in that the final drying cycle of hot air acts as a purge and blows any entrained water or impurities including solid materials and animal hairs through the piping system 56, 56' and out the discharge devices 38, 38', 74, 74'. In effect, the invention 10 has a self-cleaning mechanism to maintain itself in a contaminant free status. The enclosure 12 is made from a water resistant material, preferably fiberglass.

Figure 2:
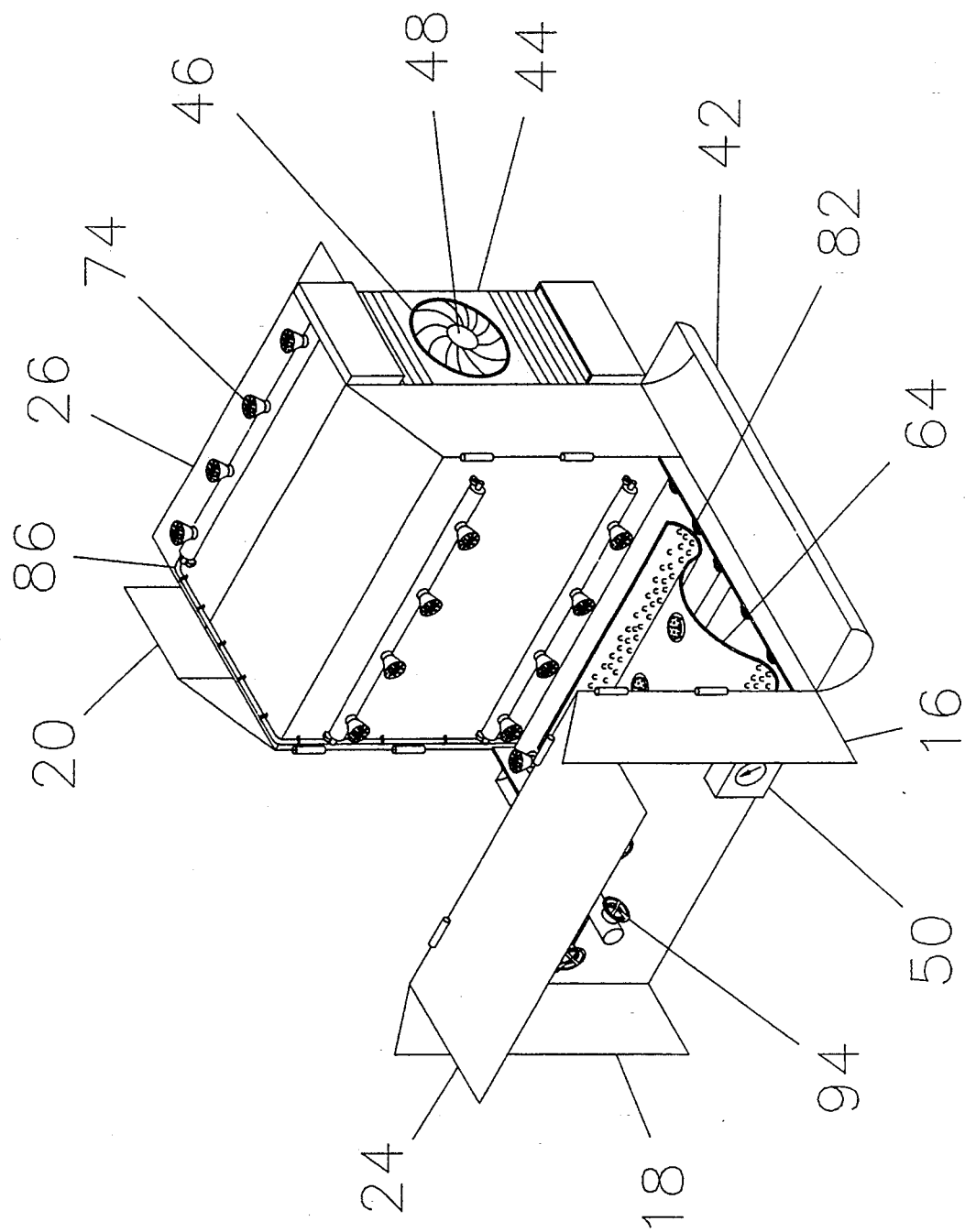
FIG. 2 is a perspective view of the invention in the open or retracted status showing the movable roof panels and movable front doors and movable rear doors and showing the plurality of oscillating shower head washing means with interconnecting tubing.
Figure 6:
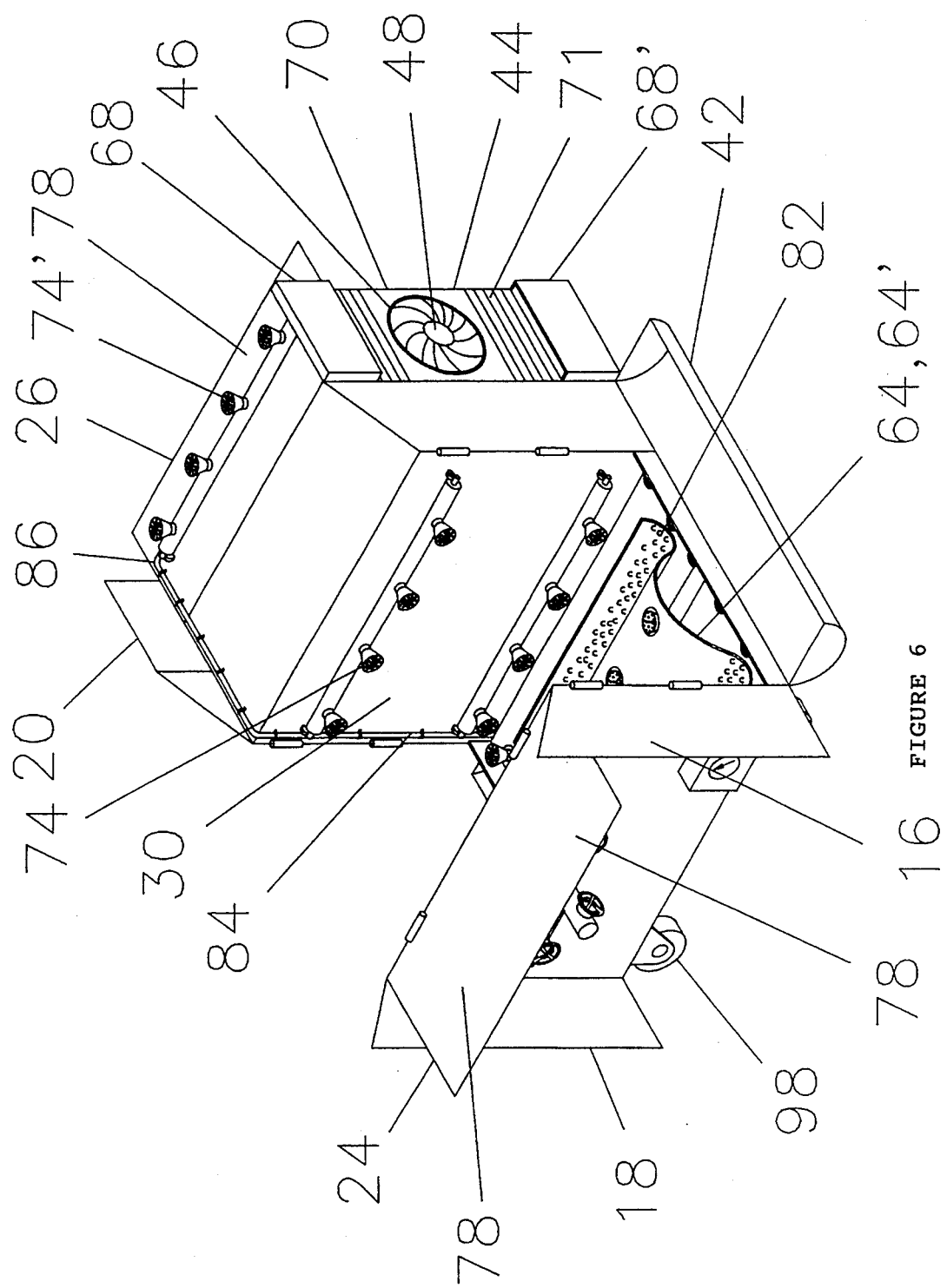
FIG. 6 is a perspective view of the mobile version of the invention in the open or retracted status showing the movable roof panels and movable front doors and movable rear doors and showing the plurality of oscillating shower head washing means with interconnecting tubing.

In use and operation the animal is washed by first preparing the system by loading the proper amount of soap in a soap dispenser 90 and installing the properly sized trough 64 on the base 32 of the enclosure 12 to maintain the separation of the legs during the washing and rinsing and drying cycle. Once this task has been completed, the operator opens the paired operable rear doors 18, 20 and the paired operable front doors 14, 16 and paired operable roof panels 24, 26 as best seen in FIGS. 2 or 6. In this manner, the task of placing the animal in the enclosure 12 is straight forward. Then, the operator closes the paired operable rear doors 18, 20, and the paired operable front doors 14, 16 and the paired operable roof panels 24, 26. The animal's head is placed through the aperture 48 in the vertically adjustable section 44 of the front door 14 to avoid a panic if the enclosure 12 were to completely surround the animal. Many animals react negatively to being totally enclosed without any light or air available.

Then the operator latches all the doors 14, 16, 18, 20 and the roof panels 24, 26 to ensure a watertight enclosure. Thereupon, the proper water temperature is set and the operator uses a flexible hose 92 provided to wash the animal's neck and head portion that protrudes through the aperture 48 in the vertically adjustable section 44 of the front door 14. The gutter 42 that is oriented below the aperture 48 receives the excess water off of the animal's neck and head portion and directs the water to a conventional floor drain (non-illustrated). After the animal's head and neck have been thoroughly rinsed, the operator releasably engages the watertight variable diameter aperture 48 around the animal's neck. After double checking that the water temperature is correct, the operator sets the timer 50 for rinsing, washing, re-rinsing and drying. A water valve 94 is then opened to provide the proper amount of water and soap and the rinsing and washing cycles are completed. In order to dry the animal, the operator opens the operable roof panels 24, 26 and towel drys the animal to remove the bulk of moisture that is still on the coat of the animal. The operator then closes the roof panels 24, 26 and engages a blower 96 or self-cleaning means to supply hot air for final drying of the animal. After the drying cycle is complete, the watertight aperture 48 of the vertically adjustable section 44 around the animal's neck is released and the operable front doors 14, 16 and rear doors 18, 20 and roof panels 24, 26 are opened to allow the operator to remove the animal completely from the enclosure 12. Finally, the operator takes the hose 92 and washes out any hair and other debris from the enclosure 12.

Figure 5:
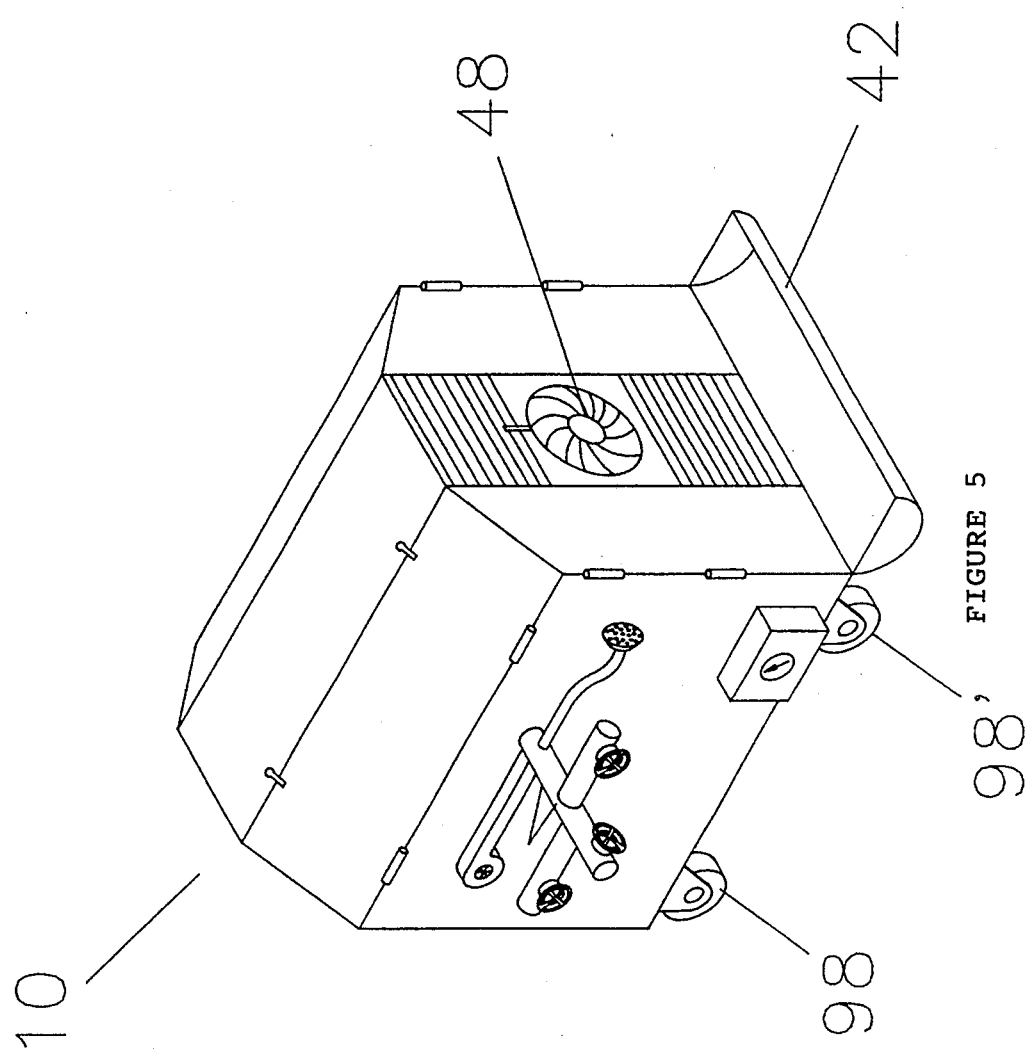
FIG. 5 is a perspective view of the mobile version of the invention with the control systems mounted on an upstanding sidewall and the invention being in a totally enclosed status.

It should be understood that the invention 10 can be mobilized with the addition of a plurality of wheels 98, 98' for those users who need portability, as best seen in FIGS. 5 and 6.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of structures and the combination and arrangement of parts may be resorted to without departing from the spirit and scope of the invention.

Now that the invention has been described,

What is claimed is:

1. A system for washing and rinsing and drying an animal automatically in an enclosed space comprising in combination:

an enclosure having paired operable front doors, paired operable rear doors, paired operable roof panels, paired fixed upstanding side walls in hingeable communication with the front doors and rear doors and roof panels, the paired operable front doors further include a first operable front door having a section vertically adjustable and further having an aperture in a central portion of the adjustable section, said adjustable section allowing said aperture to vary its position in height for releasably engaging the head of the animal during the washing and rinsing and drying cycle;

a base horizontally disposed and oriented between the paired, fixed, upstanding sidewalls; and a gutter oriented forwardly of the base and being coplanar with the base for taking up water that drips from the head and neck of the washed animal.

2. A system for washing and rinsing and drying animals in an enclosed space automatically as recited in claim 1 and further including a plurality of valves and piping adjacent to one of the upstanding sidewalls for regulating the flow and temperature of the water and soap and air for washing, rinsing, and drying the animal.

3. A system for washing and rinsing and drying animals in an enclosed space automatically as recited in claim 1 and further including a timer for controlling the flow of water and soap and heated air for washing, rinsing, and drying the animal.

4. A system for washing and rinsing and drying animals in an enclosed space automatically as recited in claim 1 wherein the operable front door further includes a pair of take up containers in a vertically opposed relationship oriented on an inner side of the operable front door of the vertically adjustable section.

5. A system for washing and rinsing and drying animals in an enclosed space automatically as recited in claim 1 and further including a plurality of discharge devices oriented on an inside surface of both upstanding sidewalls and both operable roof panels for directing the flow of wash water, rinse water, and drying air to all parts of the animal's body.

6. A system for washing and rinsing and drying animals in an enclosed space automatically as recited in claim 1 wherein the base further includes a second plurality of discharge devices disposed on a top surface of the base for directing the flow of wash water, rinse water, and drying air to the under side of the animal's body.

7. A system for washing and rinsing and drying animals in an enclosed space automatically as recited in claim 1 wherein the base further includes a plurality of removable troughs oriented on the top surface of the base for engaging the paws of the animal for urging separation of the legs during the washing, rinsing, and drying cycle.

8. A system for washing and rinsing and drying animals in an enclosed space automatically as recited in claim 1 further providing a plurality of removably interchangeable troughs, each trough is adapted to accommodate a different sized animal for maintaining the separation between the legs during the washing, rinsing, and drying cycles.

9. A system for washing and rinsing and drying animals in an enclosed space automatically as recited in claim 1 wherein the paired operable front doors and paired operable rear doors and paired operable roof panels have unequal widths.

10. A system for washing and rinsing and drying animals in an enclosed space automatically as recited in claim 1 wherein a second plurality of discharge devices are oriented in a "H" bar arrangement to facilitate the washing, rinsing, and drying of the underside of the animal's body and the inner side of the animals.

11. A system for washing and rinsing and drying animals in an enclosed space automatically as recited in claim 1 wherein the gutter is oriented below the aperture in the adjustable section for capturing the wash water and rinse water from the portion of the animal's head and neck that protrudes through the aperture.

12. A system for washing and rinsing and drying animals in an enclosed space automatically as recited in claim 1 further including a plurality of valves and pipes and a flexible hose for washing a portion of the animal's head and neck that protrudes through the aperture.

13. A system for washing and rinsing and drying animals in an enclosed space automatically as recited in claim 1 wherein the aperture further includes means to vary the size of the aperture for snug releasable engagement with the neck of the animal.

14. A system for washing and rinsing and drying animals in an enclosed space automatically as recited in claim 1 wherein the enclosure is fabricated from a water resistant surface, preferably fiberglass.

15. A system for washing and rinsing and drying animals in an enclosed space automatically as recited in claim 12 wherein the plurality of valves and pipes further includes a temperature control sensor oriented in a downstream portion of the pipes for sensing and transmitting the water temperature to an attached automatic timing device for insuring that the animal does not get scalded.

16. A system for washing and rinsing and drying animals in an enclosed space automatically as recited in claim 15 wherein the plurality of valves and pipes further includes self-cleaning means for keeping the system free of impurities and contaminants by purging hot dry air circulated throughout the plurality of valves and pipes for removing any entrained impurities or solid surfaces including dog hair and minerals.

* * * * *